United States Patent [19]

Shay et al.

[11] Patent Number: 5,486,587
[45] Date of Patent: Jan. 23, 1996

[54] AQUEOUS LATEXES CONTAINING MACROMONOMERS

[75] Inventors: Gregory D. Shay, Cary, N.C.; Richard D. Jenkins, Hurricane; David R. Bassett, Charleston, both of W. Va.

[73] Assignee: Union Carbide Chemicals & Plastics Technology Corporation, Danbury, Conn.

[21] Appl. No.: 107,330

[22] Filed: Aug. 16, 1993

Related U.S. Application Data

[63] Continuation of Ser. No. 887,671, May 29, 1992, abandoned.

[51] Int. Cl.$^6$ ............................................. C08F 16/12
[52] U.S. Cl. ........................... 526/333; 526/332; 524/376; 524/549
[58] Field of Search ......................... 524/376, 549; 526/332, 333

[56] References Cited

U.S. PATENT DOCUMENTS

| | | | |
|---|---|---|---|
| Re. 30,530 | 2/1981 | Hopwood | 526/304 |
| Re. 33,156 | 1/1890 | Shay et al. | 526/301 |
| 2,458,423 | 1/1949 | Reynolds et al. | 260/33 |
| 2,606,892 | 8/1952 | Kropa et al. | 260/80.3 |
| 3,035,004 | 5/1962 | Glavis | 260/29.7 |
| 3,190,925 | 6/1965 | Stowe | 260/611 |
| 3,242,140 | 3/1966 | Hoover | 260/77.5 |
| 3,277,157 | 10/1966 | Stewart et al. | 260/486 |
| 3,341,627 | 9/1967 | Wilkinson | 260/898 |
| 3,499,876 | 3/1970 | Field et al. | 260/78.5 |
| 3,652,497 | 3/1972 | Junas et al. | 260/47 |
| 3,657,175 | 4/1972 | Zimmerman | 260/29.6 |
| 3,794,608 | 2/1974 | Evani et al. | 260/29.6 |
| 3,894,980 | 7/1975 | DeTommaso | 260/29.6 |
| 3,896,161 | 7/1975 | Borden et al. | 260/486 |
| 3,915,921 | 10/1975 | Schlatzer, Jr. | 260/17.4 |
| 3,940,351 | 2/1976 | Schlatzer, Jr. | 260/17.4 |
| 3,960,935 | 6/1976 | Semour | 260/485 |
| 4,008,202 | 2/1977 | Evani et al. | 260/47 UA |
| 4,075,411 | 2/1978 | Dickstein | 560/224 |
| 4,079,028 | 3/1978 | Emmons et al. | 260/29.6 |
| 4,085,167 | 4/1978 | Lewis et al. | 260/885 |
| 4,128,520 | 12/1978 | Barabas et al. | 260/29.7 |
| 4,138,381 | 2/1979 | Chang et al. | 260/29.6 |
| 4,155,892 | 5/1979 | Emmons et al. | 260/29.2 |
| 4,167,502 | 9/1979 | Lewis et al. | 260/29.6 |
| 4,226,754 | 10/1980 | Yun et al. | 260/29.6 |
| 4,228,277 | 10/1980 | Landoll | 536/90 |
| 4,230,844 | 10/1980 | Chang et al. | 526/210 |
| 4,268,641 | 5/1981 | Koenig et al. | 525/367 |
| 4,302,375 | 11/1981 | Dixon et al. | 260/29.6 |
| 4,338,239 | 7/1982 | Dammann | 524/549 |
| 4,384,096 | 5/1983 | Sonnabend | 526/313 |
| 4,395,524 | 7/1983 | Emmons et al. | 526/307.2 |
| 4,421,902 | 12/1983 | Chang et al. | 526/317 |
| 4,423,199 | 12/1983 | Chang et al. | 526/307.6 |
| 4,426,485 | 1/1984 | Hoy et al. | 524/591 |
| 4,429,097 | 1/1984 | Chang et al. | 526/317 |
| 4,463,151 | 7/1984 | Schutz et al. | 526/307.5 |
| 4,464,524 | 8/1984 | Karickoff | 526/313 |
| 4,485,209 | 11/1984 | Fan et al. | 524/801 |
| 4,496,708 | 1/1985 | Dehm et al. | 528/76 |
| 4,509,949 | 4/1985 | Huang et al. | 586/558 |
| 4,514,552 | 4/1985 | Shay et al. | 526/301 |
| 4,569,965 | 2/1986 | Engel et al. | 524/544 |
| 4,600,761 | 7/1986 | Ruffner et al. | 526/270 |
| 4,616,074 | 10/1986 | Ruffner | 526/318 |
| 4,703,080 | 10/1987 | Shay et al. | 524/555 |
| 4,722,962 | 2/1988 | Shay et al. | 524/548 |
| 4,735,981 | 4/1988 | Rich et al. | 524/247 |
| 4,764,554 | 8/1988 | Tonge | 524/558 |
| 4,801,671 | 1/1989 | Shay et al. | 526/214 |
| 4,916,183 | 7/1990 | Barron et al. | 524/555 |
| 4,939,283 | 7/1990 | Yokota et al. | 558/33 |
| 5,006,596 | 4/1991 | Chen et al. | 524/555 |
| 5,015,711 | 5/1991 | Simonet et al. | 526/301 |
| 5,023,309 | 6/1991 | Kruse et al. | 528/49 |
| 5,109,091 | 4/1992 | Schafheutle et al. | 526/301 |
| 5,124,393 | 6/1992 | Ingle et al. | 524/458 |
| 5,173,534 | 12/1992 | Biale | 524/555 |
| 5,234,773 | 8/1993 | Biale | 428/523 |
| 5,244,963 | 9/1993 | Biale | 524/555 |

FOREIGN PATENT DOCUMENTS 2745872 10/1979 Germany ............................ C09B 76/00

OTHER PUBLICATIONS

Jenkins, R. D. et al., Associative Polymers with Novel Hydrophobe Structures, ACS Meeting, New York, N.Y., Aug. 26, 1991.
Nemoto, H. et al., J. Org. Chem., 1992, 57, 435.
U.S. patent application Ser. No. 07/304,258 (D-15741), filed Jan. 31, 1989.

*Primary Examiner*—Edward Cain
*Attorney, Agent, or Firm*—R. M. Allen; G. L. Coon

[57] ABSTRACT

An aqueous emulsion copolymer of monoethylenically unsaturated monomers which includes from about 0.1 weight % or less to about 10 weight % or greater of a monoethylenically unsaturated macromonomer. These monomers can improve the brush drag of paints made with the emulsion copolymers, and in some instances the leveling is simultaneously improved.

22 Claims, No Drawings

AQUEOUS LATEXES CONTAINING MACROMONOMERS

This application is a Continuation of prior U.S. application: Ser. No. 07/887,671 Filing Date May 29, 1992, now abandoned.

RELATED APPLICATIONS

The following are related, commonly assigned applications, filed on an even date herewith:

U.S. patent application Ser. No. 07/887,647; U.S. patent application Ser. No. 07/887,646; U.S. patent application Ser. No. 07/887,642; U.S. patent application Ser. No. 07/887,673; U.S. patent application Ser. No. 07/887,672; U.S. patent application Ser. No. 07/887,641; U.S. patent application Ser. No. 07/887,648; U.S. patent application Ser. No. 07/887,643; U.S. patent application Ser. No. 07/887,644 and U.S. patent application Ser. No. 07/887,645 all of which are incorporated herein by reference.

BRIEF SUMMARY OF THE INVENTION

1. Technical Field

This invention relates to aqueous emulsion copolymers which may be included in aqueous air drying latex paints in order to improve the rheology of the paint.

2. Background of the Invention

Aqueous latex paints are in common use, and these paints are frequently applied by brush. It has long been desired to include materials in the paint which will function to improve the brush drag and leveling which are obtained. While reference has been made to paint application by brushing, it will be understood that essentially the same problems effect roller application.

Brush drag is the resistance to motion of the brush as it is drawn across the surface to be painted. Aqueous latex paints are frequently too fluid, and low viscosity paints offer little resistance to brush motion. The result is that the applied coating is too thin, and insufficient paint is applied to cover and hide the surface being painted. Brush drag is improved when the viscosity under the sharing force imposed by the moving brush is increased. With greater brush drag, a greater thickness of paint is applied, and the surface being painted is thus properly covered.

Leveling is the capacity of a paint to flow out and provide a smooth and level surface. When a film of paint is brushed onto a surface with sufficient viscosity to apply a paint layer of proper thickness, the fibers in the brush leave ridges in the applied film. If the paint is too viscous, these ridges remain in the applied film as it dries, and the resulting solid paint film is not smooth and level, as is desired.

As will be evident, one needs increased viscosity to provide adequate brush drag to apply a paint film of proper thickness. At the same time, one needs decreased viscosity in order that the brush marks will flow out and disappear as the applied paint film dries. These apparently opposite characteristics exist under different conditions, the brush drag at high shear and the leveling at low shear. This raises the prospect that both may be improved at the same time.

DISCLOSURE OF THE INVENTION

In accordance with this invention, an aqueous emulsion copolymer is prepared by the copolymerization in aqueous emulsion of monoethylenically unsaturated monomers which provide a copolymer having a glass transition temperature below about 30° C., preferably below about 20° C. and which include from about 0.1 weight % or less to about 10 weight % or greater, preferably from about 1 to 5 weight %, of one or more monoethylenically unsaturated macromonomers.

The macromonomers useful in this invention can be represented by the formula:

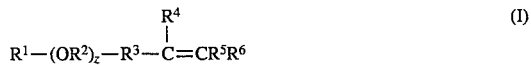

wherein:

- $R^1$ is a monovalent residue of a substituted or unsubstituted complex hydrophobe compound;
- each $R^2$ is the same or different and is a substituted or unsubstituted divalent hydrocarbon residue;
- $R^3$ is a substituted or unsubstituted divalent hydrocarbon residue;
- $R^4$, $R^5$ and $R^6$ are the same or different and are hydrogen or a substituted or unsubstituted monovalent hydrocarbon residue; and
- z is a value of 0 or greater.

DETAILED DESCRIPTION

This invention can provide aqueous latex paints with improved brush drags, especially in combination with improved leveling. These paints can be used to adequately cover a substrate with a single application and will flow out to conceal application irregularities, and this will take place regardless of how the paint is applied, e.g., by brush or by roller.

The macromonomer compounds useful in this invention can be prepared by a number of conventional processes, except for inclusion of the complex hydrophobe compounds described herein. Illustrative processes are described, for example, in U.S. Pat. Nos. 4,514,552, 4,600,761, 4,569,965, 4,384,096, 4,268,641, 4,138,381, 3,894,980, 3,896,161, 3,652,497, 4,509,949, 4,226,754, 3,915,921, 3,940,351, 3,035,004, 4,429,097, 4,421,902, 4,167,502, 4,764,554, 4,616,074, 4,464,524, 3,657,175, 4,008,202, 3,190,925, 3,794,608, 4,338,239, 4,939,283 and 3,499,876. The macromonomers can also be prepared by methods disclosed in copending U.S. patent application Ser. No. 07/887,645, which is incorporated herein by reference. Other macromonomer compounds which may be useful in this invention include complex hydrophobe-containing oligomers disclosed in copending U.S. patent application Ser. No. 07/887,646, which is incorporated herein by reference.

Illustrative substituted and unsubstituted divalent hydrocarbon residues represented by $R^2$ in formula I above include those described for the same type of substituents in formulae (i) and (ii) below. Illustrative substituted and unsubstituted monovalent hydrocarbon residues represented by $R^4$, $R^5$ and $R^6$ in formula I above include those describe for the same type of substituents in formulae (i) and (ii) below.

Illustrative $R^3$ substituents include, for example, the organic residue of ethers, esters, urethanes, amides, ureas, anhydrides and the like including mixtures thereof. The $R^3$ substituent can be generally described as a "linkage" between the complex hydrophobe bearing surfactant or alcohol, and the unsaturation portion of the macromonomer compound. Preferred linkages include the following: urethane linkages from the reaction of an isocyanate with a nonionic surfactant; urea linkages from the reaction of an isocyanate with an amine bearing surfactant; unsaturated esters of surfactants such as the esterification product of a surfactant with of an unsaturated carboxylic acid or an unsaturated anhydride; unsaturated esters of alcohols; esters of ethyl acrylate oligomers, acrylic acid oligomers, and allyl containing oligomers; half esters of surfactants such as those made by the reaction of a surfactant with maleic anhydride; unsaturated ethers prepared by reacting vinyl benzyl chloride and a surfactant or by reacting an allyl glycidyl ether with a surfactant, alcohol, or carboxylic acid.

The oxyalkylene moieties included in the macromonomer compounds (I) may be homopolymers or block or random copolymers of straight or branched alkylene oxides. Mixtures of alkylene oxides such as ethylene oxide and propylene oxide may be employed. It is understood that each $R^2$ group in a particular substituent for all positive values of z can be the same or different.

The complex hydrophobe compounds having at least one active hydrogen useful in preparing the macromonomer compounds of this invention can be represented by the formula:

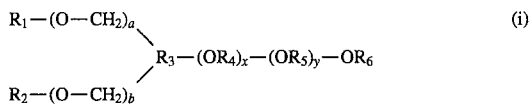

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$.

Other complex hydrophobe compounds having at least one active hydrogen useful in preparing the macromonomer compounds of this invention can be represented by the formula:

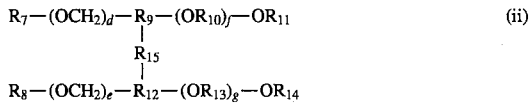

wherein $R_7$ and $R_8$ are the same or different and are hydrogen or a substituted or unsubstituted monovalent hydrocarbon residue, $R_{11}$ and $R_{14}$ are the same or different and are hydrogen, a substituted or unsubstituted monovalent hydrocarbon residue or an ionic substituent, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ and $R_{14}$ or having greater than 2 pendant carbon atoms in the case of $R_9$, $R_{10}$, $R_{12}$, $R_{13}$ and $R_{15}$.

Illustrative substituted and unsubstituted monovalent hydrocarbon residues contain from 1 to about 50 carbon atoms or greater and are selected from alkyl radicals including linear or branched primary, secondary or tertiary alkyl radicals, such as methyl, ethyl, n-propyl, isopropyl, amyl, sec-amyl, t-amyl, 2-ethylhexyl and the like; aryl radicals such as phenyl, naphthyl and the like; arylalkyl radicals such as benzyl, phenylethyl, tri-phenylmethylethane and the like; alkylaryl radicals such as octylphenyl, nonylphenyl, dodecylphenyl, tolyl, xylyl and the like; and cycloalkyl radicals such as cyclopentyl, cyclohexyl, cyclohexylethyl and the like. The permissible hydrocarbon residues may contain fluorine, silicon, or other non-carbon atoms.

Preferably, the substituted and unsubstituted hydrocarbon residues are selected from alkyl and aryl radicals which contain from about 1 to 30 carbon atoms or greater. More preferably, the alkyl radicals contain from 1 to 18 carbon atoms, while the aryl, arylalkyl, alkylaryl and cycloalkyl radicals preferably contain from 6 to 18 carbon atoms or greater.

In a preferred embodiment of this invention, $R_1$, $R_2$, $R_7$ and $R_8$ can individually be a hydrocarbon radical represented by the formula:

wherein $R_{16}$ and $R_{17}$ are as defined for $R_1$, $R_2$, $R_7$ and $R_8$ above, h and i are the same or different and are a value of 0 or 1, and $R_{18}$ is as defined for $R_3$ above. For compounds represented by formulae (i) and (ii), it is understood that each formula (iii) radical in a given compound may be the same or different and the $R_{16}$ and/or $R_{17}$ groups may themselves be a formula (iii) radical to provide complex hydrophobes of a dendritic or of a cascading nature as described below. Further, $R_4$, $R_5$, $R_{10}$ and $R_{13}$ can individually be a hydrocarbon radical represented by the formula:

wherein $R_{19}$ is as defined for $R_4$, $R_5$, $R_{10}$ and $R_{13}$ above, $R_{20}$ is as defined for $R_6$, $R_{11}$ and $R_{14}$ above, and j is a value of 0 or greater.

Illustrative ionic substituents for $R_6$, $R_{11}$, $R_{14}$ and $R_{20}$ include cationic and anionic substituents such as sulfates, sulfonates, phosphates and the like. $R_6$, $R_{11}$, $R_{14}$ and $R_{20}$ may preferably be an organic residue containing 1 or more hydroxyls or nitrogen derivatives or epoxides or other reactive groups which may or may not contain unsaturation.

Other illustrative terminal groups which are described by $R_6$, $R_{11}$, $R_{14}$ and and $R_{20}$ include, for example, hydrocarbon residues which may contain allylic or vinylic unsaturation, acrylic or methacrylic functionality, styryl or alpha-methylstyryl functionality, and the like, such as the reaction product between the terminal alcohol ($R_6$, $R_{11}$, $R_{14}$ and $R_{20}$=H) and glycidyl methacrylate, isocyanatoethyl methacrylate, alpha, alpha-dimethyl-m-isopropenyl benzyl isocyanate (m-TMI), and the like. Other examples of terminal groups may include hydrocarbon residues of alkyl, aryl, aralkyl, alkaryl, and cycloalkyl radicals which may or may not be substituted with one or more of the following: hydroxyl, carboxyl, isocyanato, amino, mono- or disubstituted amino, quaternary ammonium, sulfate, sulfonate, phosphate, epoxy, and the like and may or may not contain other non-carbon atoms including silicon or fluorine. Also included can be divalent siloxy radicals. Other nonhydrocarbon terminal groups may include sulfates, phosphates, and the like.

Illustrative divalent hydrocarbon residues represented by $R_3$, $R_4$, $R_5$, $R_9$, $R_{10}$, $R_{12}$, $R_{13}$, $R_{15}$, $R_{18}$ and $R_{19}$ in the above formulae include substituted and unsubstituted radicals selected from alkylene, -alkylene-oxy-alkylene-, -arylene-oxy-arylene-, arylene, alicyclic radicals, phenylene, naphthylene, -phenylene-$(CH_2)_m(Q)_n(CH_2)_m$-phenylene- and -naphthylene-$(CH_2)_m(Q)_n(CH_2)_m$-naphthylene- radicals, wherein Q individually represents a substituted or unsubstituted divalent bridging group selected from —$CR_{21}R_{22}$—, —O—, —S—, —$NR_{23}$—, —$SiR_{24}R_{25}$— and —CO—, wherein $R_{21}$ and $R_{22}$ individually represent a radical selected from hydrogen, alkyl of 1 to 12 carbon atoms, phenyl, tolyl and anisyl; $R_{23}$, $R_{24}$ and $R_{25}$ individually represent a radical selected from hydrogen and methyl, and each m and n individually have a value of 0 or 1. More specific illustrative divalent radicals represented by $R_3$, $R_4$, $R_5$, $R_9$, $R_{10}$, $R_{12}$, $R_{13}$, $R_{15}$, $R_{18}$ and $R_{19}$ include, e.g., 1,1-methylene, 1,2-ethylene, 1,3-propylene, 1,6-hexylene, 1,8-octylene, 1,12-dodecylene, 1,4-phenylene, 1,8-napthylene, 1,1'-biphenyl-2,2'-diyl, 1,1'-binaphthyl-2,2'-diyl, 2,2'-binaphthyl-1,1'-diyl and the like. The alkylene radicals may contain from 2 to 12 carbon atoms or greater, while the arylene radicals may contain from 6 to 18 carbon atoms or greater. Preferably, $R_3$, $R_4$, $R_5$, $R_9$, $R_{10}$, $R_{12}$, $R_{13}$, $R_{15}$, $R_{18}$ and $R_{19}$ are an alkylene or arylene radical. The permissible divalent hydrocarbon residues may contain fluorine, silicon, or other non-carbon atoms.

Illustrative trivalent hydrocarbon residues represented by $R_3$, $R_9$, $R_{12}$ and $R_{18}$ in the above formulae include substituted and unsubstituted radicals selected from >CH—, >$C(R_{26})$—, >$CR_{27}$— and the like, wherein $R_{26}$ is a substituted or unsubstituted monovalent hydrocarbon residue as described herein and $R_{27}$ is a substituted or unsubstituted divalent hydrocarbon residue as described herein.

Of course, it is to be further understood that the hydrocarbon residues in the above formulae may also be substituted with any permissible substituent. Illustrative substituents include radicals containing from 1 to 18 carbon atoms such as alkyl, aryl, aralkyl, alkaryl and cycloalkyl radicals; alkoxy radicals; silyl radicals such as —$Si(R_{28})_3$ and —$Si(OR_{28})_3$, amino radicals such as —$N(R_{28})_2$; acyl radicals such as —$C(O)R_{28}$; acyloxy radicals such as —$OC(O)R_{28}$; carbonyloxy radicals such as —$COOR_{28}$; amido radicals such as —$C(O)N(R_{28})_2$ and —$N(R_{28})COR_{28}$; sulfonyl radicals such as —$SO_2R_{28}$; sulfinyl radicals such as —$SO(R_{28})_2$; thionyl radicals such as —$SR_{28}$; phosphonyl radicals such as —$P(O)(R_{28})_2$; as well as halogen, nitro, cyano, trifluoromethyl and hydroxy radicals and the like, wherein each $R_{28}$ can be a monovalent hydrocarbon radical such as alkyl, aryl, alkaryl, aralkyl and cycloalkyl radicals, with the provisos that in amino substituents such as —$N(R_{28})_2$, each $R_{28}$ taken together can also compromise a divalent bridging group that forms a heterocyclic radical with the nitrogen atom, in amido substituents such as —$C(O)N(R_{28})_2$ and —$N(R_{28})COR_{28}$, each $R_{28}$ bonded to N can also be hydrogen, and in phosphonyl substituents such as —$P(O)(R_{28})_2$, one $R_{28}$ can by hydrogen. It is to be understood that each $R_{28}$ group in a particular substituent may be the same or different. Such hydrocarbon substituent radicals could possibly in turn be substituted with a permissible substituent such as already herein outlined above.

Preferred alkylene oxides which can provide random or block oxyalkylene units in the complex hydrophobe compounds represented by formulae (i) and (ii) include alkylene oxides such as ethylene oxide, propylene oxide, 1,2-butylene oxide, 2,3-butylene oxide, 1,2- and 2,3-pentylene oxide, cyclohexylene oxide, 1,2-hexylene oxide, 1,2-octylene oxide, 1,2-decylene oxide, and higher alpha-olefin epoxides; epoxidized fatty alcohols such as epoxidized soybean fatty alcohols and epoxidized linseed fatty alcohols; aromatic epoxides such as styrene oxide and 2-methylstyrene oxide; and hydroxy- and halogen-substituted alkylene oxides such as glycidol, epichlorohydrin and epibromohydrin. The preferred alkylene oxides are ethylene oxide and propylene oxide. Also included can be hydrocarbon residues from substituted and unsubstituted cyclic esters or ethers such as oxetane and tetrahydrofuran. It is understood that the compounds represented by formulae (i) and (ii) herein can contain random and/or block oxyalkylene units as well as mixtures of oxyalkylene units. It is further understood that each $R_4$, $R_5$, $R_{10}$, $R_{13}$ and $R_{19}$ group in a particular substituent for all positive values of x, y, f, g and j respectively can be the same or different.

The values of x, y, z, f, g and j are not narrowly critical and can vary over a wide range. For example, the values of x, y, z, f, g and j can range from 0 to about 200 or greater, preferably from about 0 to about 100 or greater, and more preferably from about 0 to about 50 or greater. Any desired amount of alkylene oxide can be employed, for example, from 0 to about 90 weight percent or greater based on the weight of the complex hydrophobe compound.

Referring to the general formulae (i) and (ii) above, it is appreciated that when $R_1$, $R_2$, $R_7$ and/or $R_8$ are a hydrocarbon residue of formulae (iii) above, the resulting compound may include any permissible number and combination of hydrophobic groups of the dendritic or cascading type. Such compounds included in the above general formulae should be easily ascertainable by one skilled in the art. Illustrative complex hydrophobe compounds having at least one active hydrogen useful in this invention and processes for preparation thereof are disclosed in copending U.S. Patent Application Serial No. (D-17008), which is incorporated herein by reference.

In a preferred embodiment of this invention, the structure shown in formula (iii) can be a residue of the reaction product between epichlorohydrin and an alcohol, including those alcohols whose residues can be described by formula (iii), or a phenolic, or a mixture thereof. The structures which result can be described as complex hydrophobes of a dendritic or of a cascading nature. Pictorially, they can be described as shown below:

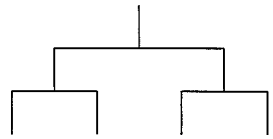

Preferred macromonomer compounds of this invention include those represented by the formulae:

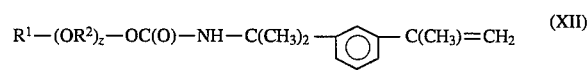 (XII)

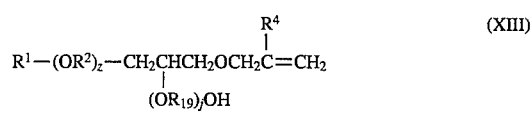 (XIII)

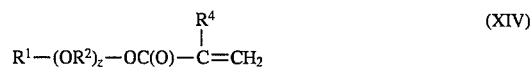 (XIV)

wherein $R^1$, $R^2$, $R^4$, $R_{19}$, z and j are as defined herein.

The macromonomer compounds produced by the processes of this invention can undergo further reaction(s) to afford desired derivatives thereof. Such permissible derivatization reactions can be carried out in accordance with conventional procedures known in the art. Illustrative derivatization reactions include, for example, esterification, etherification, alkoxylation, amination, alkylation, hydrogenation, dehydrogenation, reduction, acylation, condensation, carboxylation, oxidation, silylation and the like, including permissible combinations thereof. This invention is not intended to be limited in any manner by the permissible derivatization reactions or permissible derivatives of macromonomer compounds.

More particularly, the hydroxyl-terminated macromonomer compounds of this invention can undergo any of the known reactions of hydroxyl groups illustrative of which are reactions with acyl halides to form esters; with ammonia, a nitrile, or hydrogen cyanide to form amines; with alkyl acid sulfates to form disulfates; with carboxylic acids and acid anhydrides to form esters and polyesters; with alkali metals to form salts; with ketenes to form esters; with acid anhydrides to form carboxylic acids; with oxygen to form aldehydes and carboxylic acids; ring-opening reactions with lactones, tetrahydrofuran; dehydrogenation to form aldehydes, isocyanates to form urethanes, and the like.

The monoethylenically unsaturated macromonomer is subject to considerably variation within the formula presented previously. The essence of the macromonomer is a complex hydrophobe carrying a polyethoxylate chain (which may include some polypropoxylate groups) and which is terminated with at least one hydroxy group. When the hydroxy-terminated polyethoxylate complex hydrophobe used herein is reacted with a monoethylenically unsaturated monoisocyanate, for example, the result is a monoethylenically unsaturated urethane in which a complex hydrophobe polyethoxylate structure is associated with a copolymerizable monoethylenic group via a urethane linkage.

The monoethylenically unsaturated compound used to provide the monoethylenically unsaturated macromoner is subject to wide variation. Any compolymerizable unsaturation may be employed, such as acrylate and methacrylate unsaturation. One may also use allylic unsaturation, as provided by allyl alcohol. These, preferably in the form of a hydroxy-functional derivative, as is obtained by reacting $C_2$–$C_4$ monoepoxide, like ethylene oxide, propylene oxide or butylene oxide, with acrylic or methacrylic acid to form a hydroxy ester, are reacted in equimolar proportions with an organic compound, such as toluene diisocyanate or isophorone diisocyanate. The preferred monoethylenic monoisocyanate is styryl, as in alpha, alpha-dimethyl-m-isopropenyl benzyl isocyanate. Other suitable organic compounds include, for example, monoethylenically unsaturated esters, ethers, amides, ureas, anhydrides, other urethanes and the like.

The copolymers which are modified herein provide a continuous film and are well known. These are usually copolymers of methyl methacrylate with enough butyl acrylate to provide the desired glass transition temperature, or of vinyl acetate with enough lower alkyl acrylate or methacrylate to provide the desired glass transition temperature, such as n-butyl acrylate or methacrylate, or of vinyl acetate with enough ethylene to provide the desired glass transition temperature. Other useful co-monomers such as styrene, alkyl maleates, alkyl fumarates, and esters of versatic acid may also be used.

Examples of suitable latex paint compositions include those based on resins or binders of acrylonitrile, copolymers of acrylonitrile wherein the comonomer is a diene like isoprene, butadiene or chloroprene, homopolymers of styrene, homopolymers and copolymers of vinyl halide resins such as vinyl chloride, vinylidene chloride or vinyl esters such as vinyl acetate, vinyl acetate homopolymers and copolymers, copolymers of styrene and unsaturated acid anydrides like maleic anhydrides, homopolymers and copolymers of acrylic and methacrylic acid and their esters and derivatives, polybutadiene, polyisoprene, butyl rubber, natural rubber, ethylene-propylene copolymers, olefins resins like polyethylene and polypropylene, polyvinyl alcohol, carboxylated natural and synthetic latexes, epoxies, epoxy esters and similar polymeric latex materials.

Latex paint compositions are well known in the art and typically comprise an emulsion, dispersion or suspension of discrete particles of resin binder and pigment in water. Optional ingredients typically include thickeners, antifoam agents, plasticizers, surfactants, coalescing agents, and the like.

These copolymers may include from about 0.1 to 5.0 weight % of ureido monomers to enhance wet adhesion properties as well as small amounts of hydroxy or carboxy monomers to assist copolymerization and to enhance adhesion. The ureido monomers are well known and are illustrated in U.S. Pat. Nos. 4,487,941 and 4,319,032. Similar adhesion promoters are known in U.S. Pat. Nos. 3,356,653 and 3,509,085.

These copolymers, except for the inclusion of the macromonomers which have been described, are entirely conventional. Similarly, the copolymerization in aqueous emulsion is also conventional or may be conducted using more sophisticated emulsion polymerization processing which is also known in the art such as core-shell or gradient morphology such that the monomer composition varies within the latex particles. Morphologies with soft cores and hard shells or hard cores and soft shells are possible including a change in the types of monomers used in the core and shell and throughout the gradient feeds. Most of these emulsion polymerization processes are normally conducted using a semibatch technique but are also possible in cycled continuous processing. Nonspherical particle morphology such as multilobe particles are also well known as possible using the monomers of this invention. The macromonomers can be utilized in a variety of ways during emulsion polymerization, e.g., in the monomer feed mixture or through staged feeds or power feed.

In an embodiment of this invention, the macromonomers can be made after the latex polymerization by reacting one or more complex hydrophobe compounds, e.g., surfactant, containing one or more functional groups with a complementary functional group on the surface of the latex or by reacting one or more complex hydrophobe compounds containing one or more complementary functional groups with a functional group on the surface of the latex. In particular, m-TMI or an anhydride such as maleic anhydride or an epoxide such as glycidyl methacrylate or glycidyl acrylates and the like, can be copolymerized with conventional emulsion polymerization monomers, preferably into the shell or surface of the latex particle. The resulting latex can then be heated in a surfactant solution until the surfactant reacts with the m-TMI or anhydride or epoxide on the surface of the latex. Such a latex polymerization can be conducted by conventional procedures.

Illustrative functional and complementary functional group combinations useful in this invention include the following:

| Functional Group | Complementary Functional Group |
|---|---|
| —NH$_2$ | —COOH<br>—COX*<br>(*X is halogen) |
| —OH<br>—SH | $\underset{\text{—CH———CH}_2}{\overset{O}{\triangle}}$<br>—C—Cl (Williamson synthesis)<br>—COOR*<br>(*OR is an ester forming group)<br>$-\text{CH}_2=\text{CH}-\overset{\overset{O}{\|}}{\text{C}}-$<br>(Michael Addition)<br>—CHO<br>(aldehyde)<br>—CRO<br>(ketone)<br>—CH$_2$OH<br>(methylol)<br>—CONH$_2$<br>$\underset{\text{—R———R'}}{\overset{O}{\triangle}}$<br>(cyclic ethers)<br>—N=C=O |

Obviously, functional and complementary functional group combinations other than those cited above can be appropriately used in the practice of this invention.

In another embodiment, the macromonomer can be made in situ in the latex copolymerization process. For example, m-TMI and other unsaturated monomers can be polymerized in the presence of one or more complex hydrophobe compounds, e.g., surfactant, in the polymerization medium. Such a method can be conducted by conventional procedures.

As used herein, the term "complex hydrophobe" is contemplated to include all permissible hydrocarbon compounds having 2 or more hydrophobe groups, e.g., bis-dodecylphenyl, bis-nonylphenyl, bis-octylphenyl and the like.

For purposes of this invention, the term "hydrocarbon" is contemplated to include all permissible compounds having at least one hydrogen and one carbon atom. In a broad aspect, the permissible hydrocarbons include acyclic and cyclic, branched and unbranched, carbocyclic and heterocyclic, aromatic and nonaromatic organic compounds which can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, amino, aminoalkyl, halogen and the like in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds.

The invention is illustrated by certain of the following examples.

EXAMPLE 1

Preparation of 1,3-Bis(nonylphenoxy)-2-propanol

To a five neck, two liter round bottom flask equipped with an addition funnel, thermometer, nitrogen dispersant tube, mechanical stirrer, and a decanting head with a water-cooled condenser were added 220 grams (1.00 mole) of nonylphenol and 250 milliliters of cyclohexane. The solution was then heated to reflux and 2.8 grams (1.3 wt. % based on nonylphenol) of potassium hydroxide in 10 milliliters of water was slowly added to the flask. After essentially all the water was recovered in the decanting head (10 milliliters+1 milliliter formed), 250.7 grams (0.91 mole) of nonylphenyl glycidyl ether as added dropwise. During the addition of the glycidyl ether, the reaction temperature was maintained between 60° and 80° C. After the addition was complete, the solution was refluxed for four hours. The contents of the flask were then washed with a five percent aqueous solution of phosphoric acid, and the organic layer was separated from the water layer and washed twice with deionized water. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 425 grams of a pale-yellow liquid. End-group MW analysis gave a molecular weight of 506.8 (theoretical MW=496.8). Ir and nmr spectra were identical to previously recorded spectra for the compound.

EXAMPLE 2

Preparation of 1,3-Bis(nonylphenoxy)-2-propanol

To a five neck, two liter round bottom flask, equipped with an addition funnel, thermometer, nitrogen dispersant tube, mechanical stirrer, and a decanting head with a water-cooled condenser, were added 300 milliliters of cyclohexane and 451.7 grams (2.05 mole) of nonylphenol. The solution was then heated to reflux and 58.9 grams (1.05 mole) of potassium hydroxide in 60 milliliters of water was slowly added via the addition funnel. After essentially all the water was recovered in the decanting head (60 milliliter+19 milliliters formed), the reaction was cooled to 40° C., and 92.5 grams (1.00 mole) of epichlorohydrin was slowly added. During the addition, the reaction temperature was maintained below 60° C. by controlling the rate of epichlorohydrin addition. After all the epichlorohydrin was added, the solution was allowed to stir for one hour, and then brought to reflux for an additional three hours. The reaction mixture was then filtered under vacuum through a steam-jacketed Buchner funnel to remove the potassium chloride formed as a by-product. The filtration process was performed a total of three times to remove the majority of the salts. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 275 grams of a pale-yellow liquid. End-group MW analysis gave a molecular weight of 459.7 (theoretical MW=496.8). Ir and nmr spectra were identical to previously recorded spectra for the compound.

EXAMPLE 3

Preparation of 5 Mole Ethoxylate of 1,3-Bis(nonylphenoxy)-2-propanol

To a 500 milliliter, stainless steel, high pressure autoclave was charged 200 grams (0.40 mole) of 1,3-bis(nonylphenoxy)-2-propanol, which contained a catalytic amount of the potassium salt of the alcohol as described in Example 1. After purging the reactor with nitrogen, the alcohol was heated to 130° C. with stirring, and 86.9 grams (2.0 mole) of ethylene oxide was added over a two hour period. The reaction temperature and pressure were maintained from 130° C. to 140° C. and 60 psig during the course of the reaction. After the addition of ethylene oxide was complete, the reaction mixture was held at 140° C. for an additional hour to allow all the ethylene oxide to cook out. The reaction mixture was dumped while hot, under nitrogen, and neutralized with acetic acid to yield 285 grams of a pale-yellow liquid.

EXAMPLE 4

Preparation of Adduct of Nonylphenyl Glycidyl Ether and 5Mole Ethoxylate of 1,3-Bis(nonylphenoxy)-2-propanol To a five neck, one liter, round bottom flask equipped as in Example 1 was added 119.8 grams (0.17 mole) of the 5 mole ethoxylate of 1,3-bis(nonylphenoxy)-2-propanol and 100 milliliters of cyclohexane. The mixture was refluxed (100° C.) for one hour to remove residual water, and then cooled to 50° C. under nitrogen to add 0.5 grams of $BF_3/Et_2O$. Nonylphenyl glycidyl ether (46.0 grams, 0.17 mole) was then added to the flask over a one hour period, and the reaction was heated to reflux. After three hours at reflux, the reaction mixture was transferred to a separatory funnel, while hot, and washed with a saturated aqueous solution of sodium bicarbonate. The organic layer was separated from the water layer, and washed twice with hot deionized water. The washes were performed at 50° C. to facilitate the separation of the two layers. The water and cyclohexane were then evaporated from the organic layer, under vacuum, to yield 145 grams of a pale-yellow, viscous liquid. End-group molecular weight analysis gave a molecular weight of 880 (theoretical molecular weight=993).

EXAMPLE 5

Preparation of Poly(nonylphenyl glycidyl ether)

To a 500 milliliter round bottom equipped with an overhead stirrer, nitrogen inlet, reflux condenser, additional funnel, and temperature controller was charged 1.9 grams of ethanol (22 mmoles) and 200 grams of cyclohexane. The solution was brought to 50° C. Once heated, 0.5 milliliters (4 mmoles) of $BF_3/Et_2O$ was added using a 2 milliliter syringe. Once the acid was added, 100.0 grams of nonylphenol glycidyl ether (362 mmoles) was added dropwise so as to maintain a reaction temperature of 45° C.–55° C. Once the glycidyl ether was added, the solution is refluxed for 3 hours, then cooled to about 50° C.

While hot (<60° C.) the organic was transferred to a separatory funnel and was washed once with 100 milliliters of 5% sodium bicarbonate solution. The aqueous layer was drained and the organic was washed two more times with 100 milliliter portions of deionized water. The aqueous layers were decanted and the organic was dried for at least 1 hour over magnesium sulfate. Once dry the magnesium sulfate was filtered from the organic which was stripped of solvent using a rotary evaporator. The final yield of viscous polymer was 100 grams. The GPC molecular weight was Mw=2600 and the Mn=1700 based on monodisperse polystyrene standards.

EXAMPLE 6

Ethoxylation of Poly(nonylphenol glycidyl ether)

To a 500 milliliter stainless steel Zipperclave was added 60.0 grams (0.035 moles based on an approximate molecular weight of 1700 gram/mole) of the resin prepared in Example 5 along with 0.5 grams of potassium hydroxide. The vessel was attached to an automated ethoxylation unit and was heated to 50° C. The vessel was continuously purged with nitrogen for 15 minutes and was then heated to 100° C. where it was again continuously purged with nitrogen for another 15 minutes. The vessel was then heated to 140° C. and was given a series of 6 purges by pressuring the vessel up to 80 psi, and then venting. Once the venting process was complete, the vessel was pressured to 20 psi with nitrogen.

The ethylene oxide lines were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until 60.0 grams of ethylene oxide (1.362 moles) was added based on a difference weight of the feed cylinder. After the feed was complete, the reaction was allowed to continue for 1 hour after which the vessel was cooled to 60° C., purged 4 times with nitrogen to 80 psi and was dumped to a container. The final product yield was 115 grams with a theoretical yield of 120 grams. The GPC molecular weight of the product was Mw= 3550 and the MN=2930 based on monodisperse polystyrene standards.

EXAMPLE 7

Preparation of Poly(phenyl glycidyl ether)

To a 500 milliliter round bottom equipped with an overhead stirrer, nitrogen inlet, reflux condenser, addition funnel, and temperature controller was charged 47.06 grams of phenol (500 mmoles) and 100 grams of toluene. The solution was brought to 50° C. Once heated, 1.0 milliliter (8 mmoles) of $BF_3/Et2O$ was added using a 2 milliliter syringe. Once the acid was added, 68.18 grams of phenyl glycidyl ether (454 mmoles) was added dropwise so as to maintain a reaction temperature of 45° C.–55° C. Once the glycidyl ether was added, the solution is refluxed for 3 hours, then cooled to about 50° C.

While hot (<60° C.) the organic was transferred to a separatory funnel and was washed once with 100 milliliters of 5% sodium bicarbonate solution. The aqueous layer was drained and the organic was washed two more times with 100 milliliter portions of deionized water. The aqueous layers were decanted and the organic was dried for at least 1 hour over magnesium sulfate. Once dry the magnesium sulfate was filtered from the organic which was stripped of solvent using a rotary evaporator. The final yield of viscous polymer was 90.3 grams (with 11% unreacted phenol). The GPC molecular weight was Mw=470 and the Mn=310 (on average a trimer) based on monodisperse polystyrene standards.

EXAMPLE 8

Preparation of 1,3-Bis(phenoxy)-2-propanol Using the Cascading Polyol Technique

To a 1 liter round bottom flask equipped with an overhead stirrer, nitrogen inlet, reflux condenser, addition funnel, and temperature controller was charged 94.11 grams of phenol (1 mole), 12.86 grams of tetraethylammonium iodide (0.05 moles), 3.00 grams of water (0.17 moles), 42.08 grams of potassium hydroxide (0.75 moles), and 250 grams of toluene. To a 100 milliliter additional funnel was charged 23.13 grams of epichlorohydrin (0.25 moles) and 50 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliters portions of deionized water. The aqueous layers were drained off, and the toluene was removed along with unreacted phenol using a rotary evaporator. The final yield of product was 64.5 grams which was 106% of theory (residual is phenol). Final product purity was about 95% as shown by GPC.

EXAMPLE 9

Dimerization of 1,3Bis(phenoxy)-2-propanol using the Cascading Polyol Technique

To a 250 milliliter round bottom flask equipped with an overhead stirrer, nitrogen inlet, reflux condenser, additional funnel, and temperature controller was charged 20.03grams of 1,3-bis(phenoxy)-2-propanol prepared in Example 8 (82 mmoles), 2.06 grams of tetraethylammonium iodide (8 mmoles), 0.49 grams of water (27 mmoles), 6.51 grams of potassium hydroxide (116 mmoles), and 125 grams of toluene. To a 100 milliliter addition funnel was charged 3.61 grams of epichlorohydrin (39 mmoles) and 25 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliter portions of deionized water. The aqueous layers were drained off, and the toluene was removed using a rotary evaporator. The final yield of product was 21.6 grams which was 101% of theory. GPC showed two major components of the product. The first was the starting material at about 41% (Mn=220) and the second was the coupled product at about 59% (Mn=520).

EXAMPLE 10

Preparation of 1,3-Bis(hexadecyloxy)-2-propanol using the Cascading Polyol Technique To a 500 milliliter round bottom flask equipped with an overhead stirrer, nitrogen inlet, reflux condenser, additional funnel, and temperature controller was charged 60.61 grams of hexadecanol (0.25 moles), 6.18 grams of tetraethylammonium iodide (0.024 moles), 1.44 grams of water (0.082 moles), 20.20 grams of potassium hydroxide (0.36 moles), and 125 grams of toluene. To a 100 milliliter addition funnel was charged 11.10 grams of epichlorohydrin (0.12 moles) and 25 grams of toluene. The solution was brought to 65° C. at which time the epichlorohydrin solution was added over a period of 15 minutes while maintaining a reaction temperature of 65° C.±5° C. The reaction was allowed to proceed for 48 hours.

After 48 hours, the solution was cooled down to room temperature. The toluene solution was washed with two 250 milliliter portions of deionized water. The aqueous layers were drained off, and the toluene was removed using a rotary evaporator. The final yield of product was 70.9 grams which is 109% of theory (residual is hexadecanol).

EXAMPLE 11

Sulfation of 1,3-Bis(nonylphenoxy)-2-propanol-block-(propylene oxide)$_{10}$-block-(ethylene oxide)$_{10}$ To a 250 milliliter round bottom flask equipped with an overhead stirrer, a temperature controller, and a vacuum adapter was added 75.0 grams of the material from Example 13 (49 mmoles). The kettle was then evacuated to <20 mmHg and heated to 100° C. to remove any water. After 1 hour, the kettle was cooled to 60° C. while under vacuum. When reaching 60° C., vacuum was broken with nitrogen and 5.3 grams of sulfamic acid (54 mmoles) was added. After charging the sulfamic acid, the kettle was heated to 110° C. and evacuated to <20 mmHg. The reaction was allowed to proceed for 3 hours.

At the end of the hold period, the kettle was cooled to 85° C. and vacuum was broken with nitrogen. 1.2 grams of diethanolamine (11 mmoles) was slowly added under a blanket of nitrogen. This solution was stirred for 30 minutes. 10 grams of ethanol was added to the kettle and the temperature was regulated to 55° C. This solution was stirred for 30 minutes. The heat was removed from the kettle and 30 grams of water along with 20 grams of ethanol were added while maintaining good agitation. The solution was stirred for 15 minutes or until cooled to room temperature (<35° C.).

The pH was checked by dissolving 2 grams of the product solution in 18 grams of deionized water. If the pH was below 6.5, 0.2 gram increments of diethanolamine was added until the pH is between 6.5 and 7.5.

EXAMPLE 12

Preparation of 1,3-Bis(nonylphenoxy)-2-propanol-block-propylene oxide)$_{10}$

To a 500 milliliter stainless steel Zipperclave was added 100.0 grams (0.202 moles) of 1,3-bis(nonylphenoxy)-2-propanol prepared in Example 1 along with 0.7 grams of potassium hydroxide. The vessel was attached to an automated unit and was heated to 50° C. The vessel was continuously purged with nitrogen for 15 minutes and was then heated to 100° C. where it was again continuously purged with nitrogen for another 15 minutes. The vessel was then heated to 140° C. and is given a series of 6 purges by pressuring the vessel up to 80 psi, and then venting. Once the venting process was completed, the vessel was pressured to 20 psi with nitrogen.

Lines connected to a cylinder which had been precharged with 117.0 grams of propylene oxide (2.02 moles) were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until all of the propylene oxide had been fed. After the feed was complete, the reaction was allowed to continue for 1 hour after which the vessel was cooled to 60° C., purged 4 times with nitrogen to 80 psi and was dumped to a container. The final product yield was 211 grams with a theoretical yield of 277 grams. The GPC molecular weight of the product was Mw=650 and the Mn=490 based on monodisperse polystyrene standards.

EXAMPLE 13

Preparation of 1,3-Bis(nonylphenoxy)-2-propanol-block-(propylene oxide)$_{10}$-block-(ethylene oxide)$_{10}$ To a 500 milliliter stainless steel Zipperclave was added 75.0 grams of the propoxylate prepared in Example 12 (0.070 moles) along with 0.3 grams of potassium hydroxide. The vessel was attached to an automated ethoxylation unit and was heated to 50° C. The vessel was continuously purged with nitrogen for 15 minutes and was then heated to 100° C. where it was again continuously purged with nitrogen for another 15 minutes. The vessel was then heated to 140° C. and was given a series of 6 purges by pressuring the vessel up to 80 psi, and then venting. Once the venting process was completed, the vessel was pressured to 20 psi with nitrogen.

The ethylene oxide lines were opened to the motor valves along with the main feed line on the Zipperclave. The feed was continued and the vessel pressure was regulated at 55 psi and a temperature of 140° C. The automation was designed to hold the temperature and the pressure within safe operating limits while addition of ethylene oxide proceeded through a pair of motor control valves. The feed was allowed to continue until 30.7 grams ethylene oxide (0.696 moles) was added based on a difference weight of the feed cylinder. After the feed was complete, the reaction is allowed to continue for 1 hour after which the vessel was cooled to 60° C., purged 4 times with nitrogen to 80 psi and was dumped to a container. The final product yield was 99 grams with a theoretical yield of 106 grams.

EXAMPLE 14

Preparation of Bis(nonylphenoxy) Adduct of 1,4-Butanediol Diglycidyl Ether

To a five neck, two liter round bottom flask equipped with an addition funnel, thermometer, nitrogen dispersant tube, mechanical stirrer, and a decanting head with a water-cooled condenser were added 506.8 grams (2.30 mole) of nonylphenol and 350 milliliters of cyclohexane. The solution was heated to reflux, and 6.5 grams (1.3 weight percent based on nonylphenol) of potassium hydroxide in 15 milliliters of water was slowly added to the round bottom flask. After all the water was recovered in the decanting head (15 milliliters + 2 milliliters formed), 220 grams (1.09 mole) of 1,4-butanediol diglycidyl ether was added dropwise between 60 and 80° C. After the addition was complete, the solution was refluxed for four hours. The contents of the flask were then washed with a five percent aqueous solution of phosphoric acid, and the organic layer was separated from the water layer and washed twice with deionized water. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 710 grams of a pale-yellow liquid. Molecular weight by end-group MW analysis was 689.9 (theoretical MW=643.0). Ir and nmr spectra were consistent with the expected structure of the product.

EXAMPLE 15

Preparation of 3 Mole Ethoxylate of 1,3-Bis(nonylphenoxy)-2-propanol

To a five hundred milliliter Zipperclave reactor were charged, under nitrogen, 200.1 grams (0.43 mole) of 1,3-bis(nonylphenoxy)-2-propanol prepared in Example 2 and 0.20 grams (0.1 weight percent) of $BF_3.Et_2O$. The reaction mixture was heated to 80° C., and 55.1 grams (1.25 mole) of ethylene oxide was fed to the reactor over a two hour period. After all the ethylene oxide was fed, the reaction mixture was allowed to cook out for one hour and then dumped hot, under nitrogen, into a jar containing 160 milliliters of a one percent aqueous solution of sodium hydroxide. The organic layer was separated from the water layer and washed twice with deionized water. The washes were performed at 90° C. to facilitate the separation of the two layers. The product was then dried by azeotropic removal of the water, using cyclohexane (300 milliliters) as the entrainer. The cyclohexane was stripped off under vacuum to give a pale-yellow liquid with a molecular weight by end-group MW analysis of 601.7 (theoretical MW=629). Ir and nmr spectra were consistent with the expected structure of the product.

EXAMPLE 16

Preparation of 8 Mole Ethoxylate of Bis(nonylphenoxy) Adduct of 1,4-Butanediol Diglycidyl Ether To a five hundred milliliter Zipperclave reactor were charged, under nitrogen, 150.2 grams (0.22 mole) of bis-(nonylphenoxy) adduct of 1,4-butanediol diglycidyl ether prepared in Example 14 and 0.30 grams (0.2 weight percent) of $BF_3.Et_2O$. The reaction mixture was heated to 80° C., and 77.5 grams (1.76 mole) of ethylene oxide was fed to the reactor over a two hour period. After all the ethylene oxide was fed, the reaction mixture was allowed to cook out for one hour and then dumped hot, under nitrogen, into a jar containing 160 milliliters of a one percent aqueous solution of sodium hydroxide. The organic layer was separated from the water layer and washed twice with deionized water. The washes were performed at 90° C. to facilitate the separation of the two layers. The product was then dried by azeotropic removal of the water, using cyclohexane (300 milliliters) as the entrainer. The cyclohexane was stripped off under vacuum to give a pale-yellow liquid with a molecular weight by end-group MW analysis of 1047 (theoretical MW=995). Ir and nmr spectra were consistent with the expected structure of the product.

EXAMPLE 17

Preparation of Macromonomer Compound

Into a 1 liter round bottom reaction flask equipped with a heating mantle, dean stark trap, condenser, thermometer, nitrogen bubbler, nitrogen purge line and stirrer was charged 300 grams of toluene and 63 grams of a surfactant identified as S-1 in Table A below. With nitrogen purge, the resulting solution was heated to reflux at approximately 110° C. and azeotroped to remove trace water to dryness. The solution was subsequently cooled to 90° C., and 1.5 grams of bismuth hex chem 28% bismuth octoate catalyst (Mooney Chemical, Inc., Cleveland, Ohio) was charged and allowed to mix well, after which a stoichiometric amount of 95% m-TMI aliphatic isocyanate (American Cyanamid, Stamford, Conn.) was charged. After the reaction proceeded at 90° C. for 1.3 hours, the resulting product was cooled to 70° C. and 0.03 grams of 2,6-di-tert-4-methyl phenol (BHT) preservative was added. The mixture was poured into a stainless steel pan with large surface area to facilitate drying. The final product was a waxy material, and is designated herein as macromonomer M-1.

TABLE A $$R_1-O-CH_2$$
$$|$$
$$CH-(OCH_2CH_2)_xOCH_2CH_2OH$$
$$|$$
$$R_2$$

$R_2$ = hydrogen or a $R_3-O-CH_2-$ residue.

| Surfactant | $R_1$ | $R_2/R_3$ | Moles of Ethoxylation |
|---|---|---|---|
| S-1 | Nonylphenol | Hydrogen ($R_2$) | 40 |
| S-2 | Nonylphenol | Nonylphenol ($R_3$) | 40 |
| S-3 | Nonylphenol | Nonylphenol ($R_3$) | 20 |
| S-4 | Nonylphenol | Octylphenol ($R_3$) | 20 |
| S-5 | Nonylphenol | Octylphenol ($R_3$) | 40 |
| S-6 | Nonylphenol | Nonylphenol ($R_3$) | 80 |
| S-7 | Nonylphenol | Nonylphenol ($R_3$) | 120 |

EXAMPLES 18–34

Preparation of Macromonomer Compounds

In a manner similar to that described in Example 17, other macromonomers were prepared using stoichiometric amounts of the surfactants and unsaturated compounds identified in Table B below.

TABLE B

| Example No. | Surfactant | Unsaturated Compound | Macromonomer Designation |
|---|---|---|---|
| 18 | S-2 | m-TMI | M-2 |
| 19 | S-3 | m-TMI | M-3 |
| 20 | S-4 | m-TMI | M-4 |
| 21 | S-5 | m-TMI | M-5 |
| 22 | S-6 | m-TMI | M-6 |
| 23 | S-7 | m-TMI | M-7 |
| 24 | S-2 | Isocyanato Ethyl Methacrylate | M-8 |
| 25 | S-5 | Isocyanato Ethyl Methacrylate | M-9 |
| 26 | S-1 | Methacrylic Anhydride | M-10 |
| 27 | S-2 | Methacrylic Anhydride | M-11 |
| 28 | S-5 | Methacrylic Anhydride | M-12 |
| 29 | S-6 | Methacrylic Anhydride | M-13 |
| 30 | S-2 | Acrylic Anhydride | M-14 |
| 31 | S-5 | Acrylic Anhydride | M-15 |
| 32 | S-6 | Acrylic Anhydride | M-16 |
| 33 | S-2 | Crotonic Anhydride | M-17 |
| 34 | S-5 | Maleic Anhydride | M-18 |

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

We claim:

1. A latex composition comprising an aqueous emulsion copolymer of monoethylenically unsaturated monomers which includes from about 0.1 weight % to about 10 weight % of one or more monoethylenically unsaturated macromonomers represented by the formula:

$$R^1-(OR^2)_z-R^3-\overset{R^4}{\underset{|}{C}}=CR^5R^6$$

wherein:

$R^1$ is a monovalent residue of a substituted or unsubstituted complex hydrophobe compound;

each $R^2$ is the same or different and is a substituted or unsubstituted divalent hydrocarbon residue;

$R^3$ is a substituted or unsubstituted divalent hydrocarbon residue;

$R^4$, $R^5$ and $R^6$ are the same or different and are hydrogen or a substituted or unsubstituted monovalent hydrocarbon residue; and z is a value of 0 or greater:

wherein the substituted or unsubstituted complex hydrophobe compound is represented by the formula selected from:

$$R_1-(O-CH_2)_a$$
$$\diagdown$$
$$R_3-(OR_4)_x-(OR_5)_y-OR_6$$
$$\diagup$$
$$R_2-(O-CH_2)_b$$

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$; and $$R_7-(OCH_2)_d-R_9-(OR_{10})_f-OR_{11}$$
$$|$$
$$R_{15}$$
$$|$$
$$R_8-(OCH_2)_e-R_{12}-(OR_{13})_g-OR_{14}$$

wherein $R_7$ and $R_8$ are the same or different and are hydrogen or a substituted or unsubstituted monovalent hydrocarbon residue, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{11}$ and $R_{14}$ are the same or different and are hydrogen, a substituted or unsubstituted monovalent hydrocarbon residue or an ionic substituent, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ an $R_{14}$ or having greater than 2 pendant carbon atoms in the case of $R_9$, $R_{10}$, $R_{12}$, $R_{13}$ and $R_{15}$.

2. The latex composition of claim 1 wherein $R_1$, $R_2$, $R_7$ and $R_8$ are selected from substituted or unsubstituted alkyl, aryl, alkylaryl, arylalkyl, cycloalkyl or mixtures thereof.

3. The latex composition of claim 1 wherein $R_1$, $R_2$, $R_7$ and $R_8$ are selected from dodecylphenyl, nonylphenyl, octylphenyl or mixtures thereof.

4. The latex composition of claim 1 wherein at least one of $R_1$, $R_2$, $R_7$ and $R_8$ is a hydrocarbon radical represented by the formula:

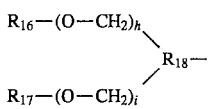

wherein $R_{16}$ and $R_{17}$ are the same or different and are hydrogen or a substituted or unsubstituted monovalent hydrocarbon residue, $R_{18}$ is a substituted or unsubstituted divalent or trivalent hydrocarbon residue, and h and i are the same or different and are a value of 0 or 1.

5. The latex composition of claim 1 wherein at least one of $R_4$, $R_5$, $R_{10}$ and $R_{13}$ is a hydrocarbon radical represented by the formula:

$$-CH[(OR_{19})_jOR_{20}]-$$

wherein each $R_{19}$ is the same or different and is a substituted or unsubstituted divalent hydrocarbon residue, $R_{20}$ is hydrogen, a substituted or unsubstituted monovalent hydrocarbon residue or an ionic substituent, and j is a value of 0 or greater.

6. The latex composition of claim 1 wherein each $R_4$, $R_5$, $R_{10}$ and $R_{13}$ is selected from $-CH_2CH_2-$, $-CH_2CH(CH_3)-$ or mixtures thereof.

7. The latex composition of claim 1 wherein $R_6$, $R_{11}$ and $R_{14}$ are hydrogen.

8. The latex composition of claim 1 wherein the values of x, y, f and g are from 0 to about 200 or greater.

9. The latex composition of claim 1 wherein $R_{15}$ is selected from -phenylene-$(CH_2)_m(Q)_n(CH_2)_m$-phenylene- and -naphthylene-$(CH_2)_m(Q)_n(CH_2)_m$-naphthylene-, wherein Q individually represents a substituted or unsubstituted divalent bridging group selected from $-CR_{21}R_{22}-$, $-O-$, $-S-$, $-NR_{23}-$, $-SiR_{24}R_{25}-$ and $-CO-$, wherein $R_{21}$ and $R_{22}$ individually represent a radical selected from hydrogen, alkyl of 1 to 12 carbon atoms, phenyl, tolyl and anisyl; $R_{23}$, $R_{24}$ and $R_{25}$ individually represent a radical selected from hydrogen and methyl, and each m and n individually have a value of 0 or 1.

10. The latex composition of claim 1 in which the monoethylenically unsaturated macromonomer is represented by the formula:

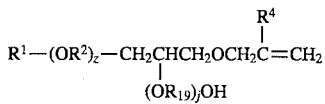

wherein $R^1$, $R^2$, $R^4$, and z are as defined in claim 1, each $R_{19}$ is the same or different and is a substituted or unsubstituted divalent hydrocarbon residue and j is a value of 0 or greater.

11. The latex composition of claim 1 in which the monoethylenically unsaturated macromonomer is represented by the formula:

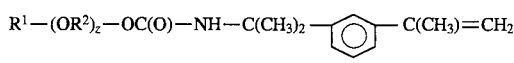

wherein $R^1$, $R^2$, and z are as defined in claim 1.

12. The latex composition of claim 1 in which the monoethylenically unsaturated macromonomer is represented by the formula:

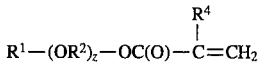

wherein $R^1$, $R^2$, $R^4$, and z are as defined claim 1.

13. The latex composition of claim 1 wherein $R^3$ is selected from an organic residue of an ether, ester, urethane, amide, urea and anhydride.

14. The latex composition of claim 1 which includes homopolymers and copolymers of acrylonitrile, homopolymers and copolymers of styrene, homopolymers and copolymers of vinyl halide resins or vinyl esters, homopolymers and copolymers of acrylic and methacrylic acid and their esters and derivatives, olefins resins and the like.

15. The latex composition of claim 1 in which said composition is an air drying and air curable composition.

16. A method of producing a latex composition which comprises (i) copolymerizing monomers, including monomers carrying a reactive group, in aqueous emulsion to provide a latex of copolymer particles containing said reactive groups, (ii) adding to said latex one or more complex hydrophobe compounds having a reactive group that is reactive with the reactive group in said copolymer particles, and (iii) causing reaction to provide one or more macromonomer side chains on said copolymer particles wherein the macromonomers are represented by the formula:

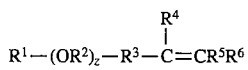

wherein:

$R^1$ is a monovalent residue of a substituted or unsubstituted complex hydrophobe compound;

each $R^2$ is the same or different and is a substituted or unsubstituted divalent hydrocarbon residue;

$R^3$ is a substituted or unsubstituted divalent hydrocarbon residue;

$R^4$, $R^5$ and $R^6$ are the same or different and are hydrogen or a substituted or unsubstituted monovalent hydrocarbon residue; and z is a value of 0 or greater.

17. A method of producing a latex composition which comprises copolymerizing monomers in aqueous emulsion in the presence of one or more complex hydrophobe compounds wherein the substituted or unsubstituted complex hydrophobe compound is represented by the formula selected from:

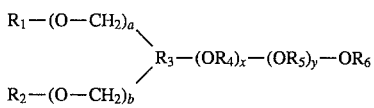

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$; and

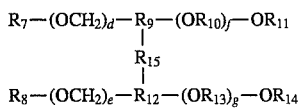

wherein $R_7$ and $R_8$ are the same or different and are hydrogen or a substituted or unsubstituted monovalent hydrocarbon residue, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue. $R_{11}$ and $R_{14}$ are the same or different and are hydrogen, a substituted or unsubstituted monovalent hydrocarbon residue or an ionic substituent, $R_{15}$ is a substituted or unsubstituted divalent hydrocarbon residue, d and e are the same or different and are a value of 0 or 1 and f and g are the same different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than two carbon atoms in the case of $R_7$, $R_8$, $R_{11}$ and $R_{14}$ or having greater than two pendant carbon atoms in the case of $R_9$, $R_{10}$, $R_{12}$, $R_{13}$ and $R_{15}$.

18. The method of claim 17 in which a macromonomer is formed in situ.

19. The method of claim 16 in which said copolymer particles have core-shell or gradient morphology.

20. The product of the method of claim 16.
21. The product of the method of claim 17.
22. The product of the method of claim 19.

* * * * *